(12) United States Patent
Grandstaff et al.

(10) Patent No.: US 9,821,779 B2
(45) Date of Patent: Nov. 21, 2017

(54) CONTROLLER AND METHOD FOR MONITORING TRAILER BRAKE APPLICATIONS

(71) Applicant: Bendix Commercial Vehicle Systems LLC, Elyria, OH (US)

(72) Inventors: Michael D Grandstaff, Medina, OH (US); John V Ripley, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 72 days.

(21) Appl. No.: 14/944,261

(22) Filed: Nov. 18, 2015

(65) Prior Publication Data

US 2017/0137003 A1 May 18, 2017

(51) Int. Cl.
*B60T 8/17* (2006.01)
*B60T 7/04* (2006.01)

(52) U.S. Cl.
CPC ............ *B60T 8/1708* (2013.01); *B60T 7/042* (2013.01); *B60T 2220/04* (2013.01)

(58) Field of Classification Search
CPC ..... B60T 8/1708; B60T 7/042; B60T 2220/04
USPC ................. 701/70, 48; 303/123, 155, 167; 340/453; 73/121
See application file for complete search history.

(56) References Cited

U.S. PATENT DOCUMENTS

| 4,712,422 | A * | 12/1987 | Munro ..................... B60T 17/22 340/453 |
| 8,127,600 | B2 * | 3/2012 | Olson ....................... B60T 7/08 73/121 |
| 9,056,537 | B2 | 6/2015 | Eberling |
| 9,162,659 | B2 | 10/2015 | Morselli |
| 2003/0177011 | A1 * | 9/2003 | Yasuda ................... G10L 21/02 704/265 |
| 2014/0226010 | A1 | 8/2014 | Molin |
| 2014/0343813 | A1 | 11/2014 | Morselli |
| 2015/0012199 | A1 | 1/2015 | Mederer |
| 2015/0094906 | A1 | 4/2015 | Greene |
| 2015/0210257 | A1 | 7/2015 | Matoy |
| 2015/0349977 | A1 | 12/2015 | Risse |

FOREIGN PATENT DOCUMENTS

| CA | 2590532 A1 | 5/2001 |
| CN | 204161355 | 2/2015 |
| EP | 0369222 B1 | 10/1989 |

* cited by examiner

*Primary Examiner* — Marthe Marc-Coleman
(74) *Attorney, Agent, or Firm* — Cheryl L. Greenly; Brian E. Kondas; Eugene E. Clair

(57) ABSTRACT

Various embodiments of a tractor controller for monitoring trailer brake applications is disclosed. The control logic of the tractor control is capable of receiving a signal indicative of a trailer brake application; receiving a signal indicative of a foot brake application; totaling a number of signals indicative of a trailer brake application for a predetermined time period; and totaling a number of signals indicative of a foot brake application for the predetermined time period. The control logic then compares the total number of signals indicative of a trailer brake application with the total number of signals indicative of a foot brake application. The control logic records a flag in response to the total number of signals indicative of a trailer brake application being greater than the total number of signals indicative of a foot brake application.

23 Claims, 2 Drawing Sheets

CONTROLLER AND METHOD FOR MONITORING TRAILER BRAKE APPLICATIONS

BACKGROUND

The present invention relates to embodiments of a controller and method for monitoring trailer brake applications. In a tractor-trailer commercial vehicle, the driver of the vehicle actuates the foot brake pedal to apply the service brakes on both the tractor and the trailer. If the driver desires to apply only the brakes on the trailer, he can actuate a trailer control brake valve in the cab of the tractor, such as the TC-7™ trailer control brake valve from Bendix Commercial Vehicle Systems LLC of Elyria Ohio. When he actuates the trailer control brake valve, the service brakes of the trailer are applied, but the service brakes of the tractor remain released. Application of the trailer control brake valve is not intended to replace a service brake application using the foot brake pedal. However, some drivers overuse the trailer control brake valve in an effort to save service brake life on the tractor at the expense of the trailer service brakes. Therefore, there is a need to monitor the use of the trailer service brakes while monitoring the use of the tractor service brakes to ensure the trailer service brakes are not being used more often than the tractor service brakes.

SUMMARY

Various embodiments of a tractor controller for monitoring trailer brake applications are disclosed. The control logic of the tractor control is capable of receiving a signal indicative of a trailer brake application; receiving a signal indicative of a foot brake application; totaling a number of signals indicative of a trailer brake application for a predetermined time period; and totaling a number of signals indicative of a foot brake application for the predetermined time period. The control logic then compares the total number of signals indicative of trailer brake applications with the total number of signals indicative of foot brake applications; and records an excess trailer brake application flag in response to the total number of signals indicative of trailer brake applications being greater than the total number of signals indicative of foot brake applications.

In accordance with another aspect, a method for monitoring trailer brake applications comprises receiving a signal indicative of a trailer brake activation at a trailer controller; totaling a number of signals indicative of a trailer brake activation during a predetermined time period; and transmitting the total number of signals indicative of trailer brake activations to a tractor controller. The method also comprises receiving the total number of signals indicative of trailer brake activations at the tractor controller; receiving a signal indicative of a brake application by a driver from the brake sensor; totaling a number of signals indicative of a brake application by a driver during the predetermined time period; comparing the total number of signals indicative of a stop light activation with the total number of signals indicative of a brake application by a driver; and recording an excess trailer brake application flag in response to the total number of signals indicative of a stop light activation being greater than the total number of signals indicative of a brake application by the driver.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
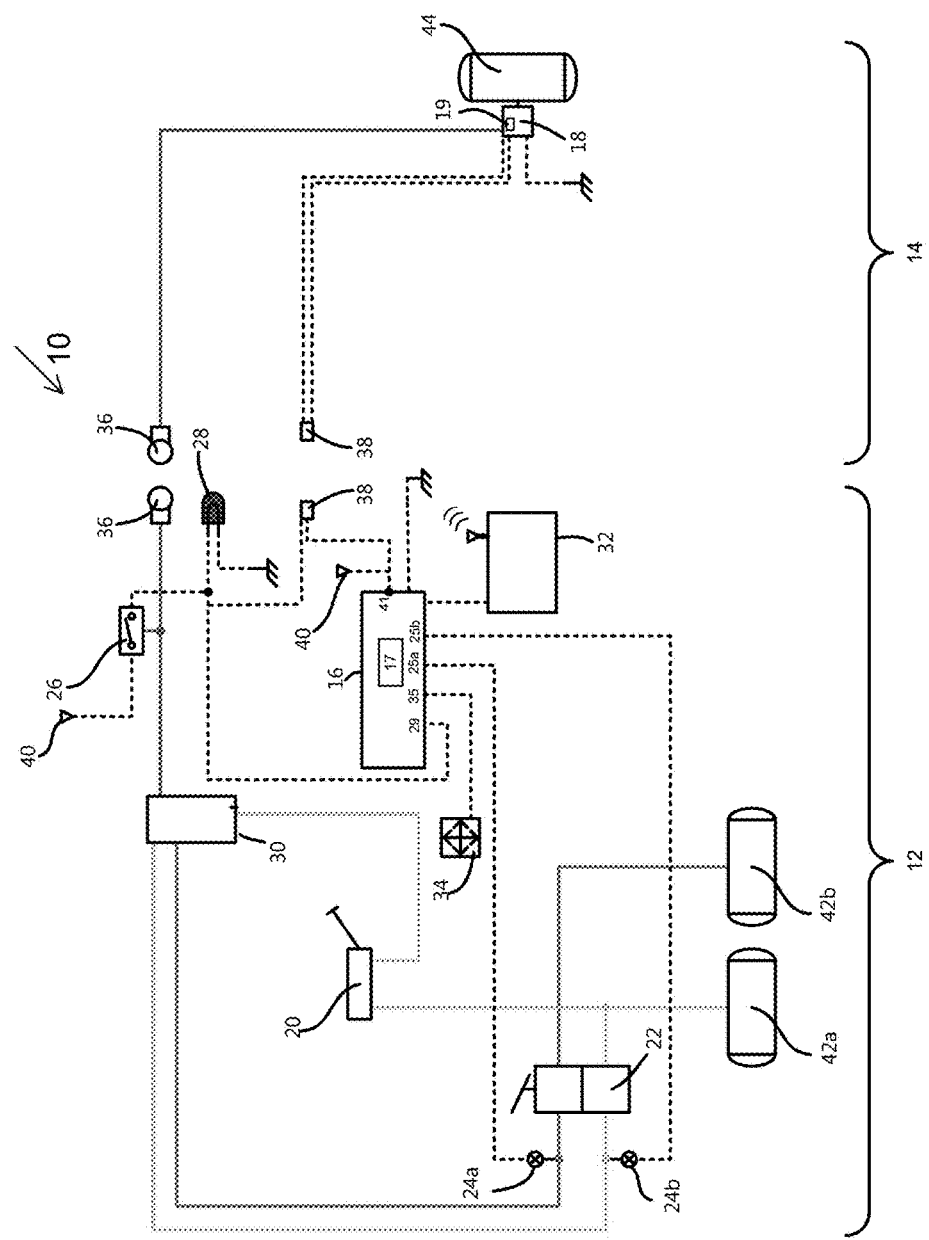
FIG. 1 illustrates a tractor trailer system according to an example of this invention.

FIG. 1 illustrates a tractor trailer braking system 10 according to an example of the present invention. The braking system 10 includes a tractor braking system 12 and a trailer braking system 14. The tractor braking system 12 is pneumatically coupled to the trailer braking system 14 through glad hands 36 and electrically coupled to the trailer braking system through electrical connectors 38.

The tractor braking system 12 includes reservoirs 42a, 42b. The reservoirs 42a, 42b contain pressurized air for use in the tractor braking system 12.

The tractor braking system 12 includes a foot brake valve 22, which communicates pneumatically with the reservoirs 42a, 42b. The driver depresses the foot brake valve 22 when he intends to apply the service brakes of the braking system 10. Air from the reservoirs 42a, 42b is delivered to other braking components (not shown) in order to slow down and stop the vehicle. Actuation of the foot brake valve 22 will apply the service brakes on both the tractor braking system 12 and the trailer braking system 14.

The tractor braking system 12 includes pressure sensors 24a, 24b. The pressure sensors 24a, 24b may be coupled to the foot brake valve 22 to measure the pressure delivered by the foot brake valve 22 when the foot brake valve 22 is actuated. The pressure sensors 24a, 24b transmit signals indicative of a foot brake application.

The tractor braking system 12 includes a trailer hand control valve 20, which communicates pneumatically with the reservoir 42a and a tractor protection valve 30. The driver manually actuates the trailer hand control valve 20 when he intends to apply the service brakes of only the trailer braking system 14. Some reasons to apply only the trailer service brake system 14 include to hold the trailer when the trailer is being coupled to the tractor and to assist preventing the vehicle from rolling backwards when stopped on a hill.

The tractor braking system 12 includes the tractor protection valve 30 that receives pressure from the foot brake valve 22 and/or the trailer hand control valve 20 and transmits the service brake pressure to the trailer braking system 14.

The tractor braking system 12 includes a stop lamp device 26. The stop lamp device 26 is coupled to the service brake delivery pressure delivered from the tractor protection valve 30. The stop lamp device 26 is in electrical communication with a vehicle power supply 40 and chassis ground. The stop lamp device 26 powers a stop lamp 28 when the service brake pressure received at the stop lamp device 26 exceeds a predefined pressure value. In one example, the predefined pressure value is about four (4) psi.

The tractor braking system includes an accelerometer 34. The accelerometer 34 measures the rate of acceleration or deceleration of the vehicle and transmits signals indicative of the acceleration.

The tractor braking system 12 optionally includes a display device 32. The display device 32 may be a lamp or indicator. Display device 32 may be a LCD display in the cab of the tractor. Display device 32 may also communicate vehicle information to a remote location via wireless communication, such that a fleet manager will receive information about the status of the tractor braking system 12 and trailer braking system 14.

The trailer braking system 14 includes reservoir 44, which contains pressurized air for use in the trailer braking system 14. Air from the reservoir 44 is delivered to other braking components (not shown) in order to brake the trailer in response to a service brake pressure received via gladhands 36 from the tractor protection valve 30.

The trailer braking system 14 includes a trailer controller 18. The trailer controller 18 receives vehicle power and a stop lamp signal via the electrical connectors 38. The trailer controller 18 may include an integral pressure sensor 19 to measure the pressure value of the service brake pressure received at the trailer controller 18. Both the stop lamp signal and the pressure value are indicators of a trailer brake application. The trailer controller 18 is capable of totaling the signals indicative of trailer brake applications. The trailer controller 18 is capable of transmitting to total number of signals indicative of the trailer brake application via the electrical connectors 38. The trailer controller 18 may use a power line carrier communication protocol, such as SAE J2497, or other protocol to communicate via the electrical connectors 38.

The tractor braking system includes a tractor controller 16. The tractor controller 16 includes an input to receive signals indicative of a foot brake application. In one example, a first input 25a receives pressure signals from the pressure sensor 24a and a second input 25b receives pressure signals from the pressure sensor 24b.

The tractor controller 16 includes another input to receive signals indicative of trailer brake applications. In one example, input 29 receives signals from the stop lamp device 26. In another example, the tractor controller 16 receives signals indicative of trailer brake applications at input 41 through the vehicle power supply 40. The signals may be received via power line carrier communications technology from the trailer controller 18 via the electrical connectors 38.

The tractor controller 16 includes another input for receiving signals indicative of automated brake applications. In one example, input 35 receives signals from the accelerometer 34. The accelerometer 34 may be stand alone (as illustrated) or integrated with the tractor controller 16. The tractor controller 16 may control the anti-lock braking and automated braking features, such as electronic stability control and advanced cruise control with braking, of the tractor parking system 12.

The tractor controller 16 includes control logic 17. The control logic 17 receives signals from the first input 25a, the second input 25b, the third input 29, the fourth input 41 and fifth input 35 in order to monitor the trailer brake system 14. The control logic 17 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 17.

The control logic 17 includes a timer. The control logic 17 is capable of totaling a number of foot brake applications for a predetermined period of time. In one example, the predetermined period of time begins when the tractor controller 16 is powered on at fourth input 41 and ends when the tractor controller 16 is powered off. In another example, a predetermined time, such as sixty (60) minutes can be preset in the control logic 17. In another example, the predetermined period of time begins when the control logic 17 receives a first signal at first input 25a and/or second input 25b indicative of a foot brake application.

The control logic 17 is capable of totaling a number of signals indicative of a trailer brake application for the same predetermined time. In one example, the predetermined time period ends when a total number of signals indicative of a trailer brake applications is greater than about 25% of the total number of signals indicative of foot brake applications. A trailer brake application can be a signal from the stop lamp device 26 as received at the third input 29.

The control logic 17 then compares the total number of signals indicative of trailer brake applications with the total number of signals indicative of foot brake applications. In another example, information from the accelerometer 34 is used to determine the rate of deceleration of the vehicle. If the vehicle is decelerating and the foot brake valve 22 is not actuated, the control logic 17 may assume that an automated braking action has been initiated. An automated braking action would decelerate the vehicle and actuate the stop lamp device 26, but would not be accompanied by a foot brake valve actuation. Therefore, the total number of decelerations without foot brake valve actuation would be subtracted from the total number of trailer brake applications.

The control logic 17 is capable of recording an excess trailer brake application flag in response to the total number of signals indicative of trailer brake applications being greater than the total number of signals indicative of foot brake applications. The flags are recorded in a non-volatile memory location for later retrieval. In addition, the control logic 17 may also be capable of indicating the flag via the display device 32 to the driver and/or fleet manager.

Therefore a tractor controller for monitoring trailer brake applications includes control logic. The control logic of the tractor control is capable of receiving a signal indicative of a trailer brake application; receiving a signal indicative of a foot brake application; totaling a number of signals indicative of a trailer brake application for a predetermined time period; and totaling a number of signals indicative of a foot brake application for the predetermined time period. The control logic then compares the total number of signals indicative of trailer brake applications with the total number of signals indicative of foot brake applications; and records a flag in response to the total number of signals indicative of trailer brake applications being greater than the total number of signals indicative of foot brake applications.

Figure 2:
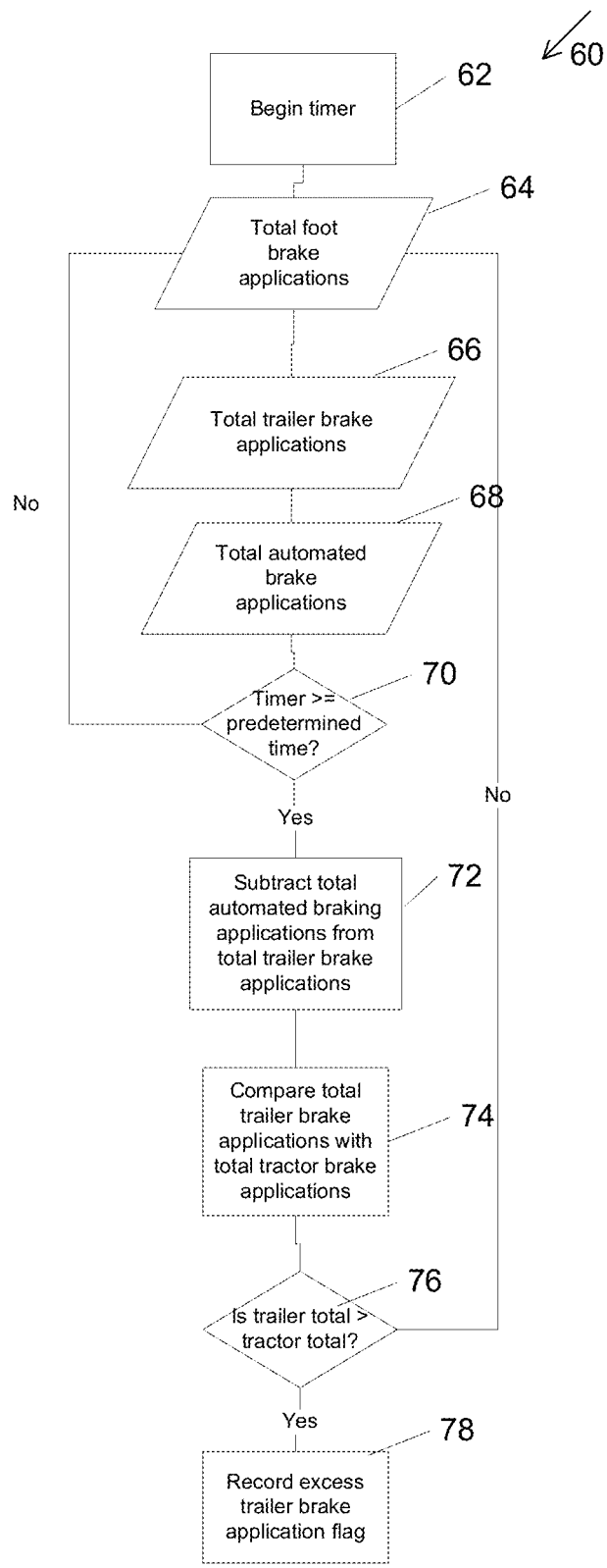
FIG. 2 illustrates a flow chart for a method of monitoring trailer brake applications according to an example of this invention.

A method 60 of monitoring trailer brake applications is illustrated in FIG. 2. A timer begins in step 62. The timer may begin with the power on of tractor controller 16. The timer may begin with the receipt of a signal indicative of an initial actuation of foot brake valve 22.

In step 64, the control logic 17 receives signals indicative of foot brake applications initiated by the driver, such as from the pressure sensors 24a, 24b coupled to the foot brake valve 22. The control logic 17 maintains a total of the number of signals received while the timer does not equal or exceed the predetermined time period.

In step 66, the control logic 17 receives signals indicative of trailer brake activations. In one manner, the activations of the stop lamp device 26 are collected as an indicator of trailer brake activations. In another example, a total number of trailer brake activations is received from the trailer controller 18. The control logic 17 maintains a total of the number of signals received while the timer does not equal or exceed the predetermined time period.

In step 68, the control logic 17 monitors for automated braking applications, such as brake applications initiated by an electronic stability control system or automated cruise control with braking system. The control logic 17 may receive signals indicative of an automatic brake application from accelerometer 34 or may maintain a total of automated braking applications initiated by the control logic 17 that required activation of the tractor braking system 12 and trailer braking system 14.

In step 70, the control logic 17 determines if the timer equals or exceeds the predetermined time period. If the predetermined time period has been met or exceeded, the method 60 continues to step 72. If the predetermined time period has not been met, the method 60 returns to step 64 and the control logic 17 continues to total foot brake applications, trailer brake applications and automated brake applications.

In step 72, the control logic 17 subtracts the total number of automated brake applications from the total number of signals indicative of tractor brake activations. This difference is then subtracted from the total number of signals indicative of trailer brake applications. This updated total number of trailer brake applications is a truer indicator of how many times the driver has initiated an application of the trailer brake system 14 via the trailer hand control valve 20.

In step 74, the control logic 17 compares the updated total number of trailer brake activations initiated by the driver with the total number of foot brake valve activations.

In step 76, the control logic 17 determines if the number of trailer brake activations is greater than the number of foot brake valve activations. Ideally, the number of trailer brake activations should be very close in number to the foot brake valve activations. Generally, fleet managers want to minimize excessive wear on trailer brakes. An independent driver may think he is preserving life of the tractor brakes by only using the trailer hand control device to apply the trailer service brakes independent of the tractor service brakes, but he may be unaware of safety issues related to this practice. In addition, the trailer braking system 14 will wear prior to the tractor braking system 12.

In step 78, an excess trailer brake application flag is recorded in the control logic 17 and the flag may be indicated to the driver or fleet manager via the display device 32. In this manner, both the driver and fleet manager will know that the driver has actuated the trailer brakes more than the tractor brakes, which is undesirable. The driver can modify his behavior or the fleet manager can take action as appropriate.

At the end of method 60, the number of tractor brake applications and trailer brake applications stored in control logic 17 may be cleared as during the next power on cycle, the tractor braking system 12 may be coupled to a different trailer braking system. The method 60 may also serve as a prognostic indicator of trailer brake wear based on the number of trailer brake activations. The tractor braking system 12 and trailer braking system 14 will experience more uniform wear if the driver is made aware of potential overuse of the trailer hand control valve 20.

Therefore, this method 60 monitors the use of the trailer brakes while monitoring the use of the tractor brakes to ensure the trailer brakes are not being used more often than the tractor brakes. This method 60 may prevent premature wear of the trailer brakes through awareness of driver braking behavior.

Therefore, a method for monitoring trailer brake applications comprises receiving a signal indicative of a trailer brake activation at a trailer controller; totaling a number of signals indicative of a trailer brake activation during a predetermined time period; and transmitting the total number of signals indicative of trailer brake activations to a tractor controller. The method also comprises receiving the total number of signals indicative of trailer brake activations at the tractor controller; receiving a signal indicative of a brake application by a driver from the brake sensor; totaling a number of signals indicative of a brake application by a driver during the predetermined time period; comparing the total number of signals indicative of a stop light activation with the total number of signals indicative of a brake application by a driver; and recording an excess trailer brake application flag in response to the total number of signals indicative of a stop light activation being greater than the total number of signals indicative of a brake application by the driver.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A tractor controller for monitoring trailer brake applications comprising:
   control logic, the control logic:
      receiving a signal indicative of a trailer brake application;
      receiving a signal indicative of a foot brake application;
      receiving a signal indicative of deceleration of the vehicle;
      totaling a number of signals indicative of a trailer brake application for a predetermined time period;
      totaling a number of signals indicative of a foot brake application for the predetermined time period;
      totaling the number of signals indicative of deceleration of the vehicle for the predetermined time period; and
      recording an excess trailer brake application flag in response to the difference between the total number of signals indicative of trailer brake applications and the total number of signals indicative of deceleration of the vehicle being greater than the total number of signals indicative of foot brake applications.

2. The tractor controller as in claim 1, wherein the predetermined time period begins at a power on of the tractor controller and ends at a power off of the tractor controller.

3. The tractor controller as in claim 1, wherein the predetermined time period begins upon receiving an initial signal indicative of a foot brake application and ends in response to the total number of signals indicative of a trailer brake application being greater than 25% of the total number of signals indicative of a foot brake application.

4. The tractor controller as in claim 1, wherein the predetermined time period is about sixty (60) minutes.

5. The tractor controller as in claim 1, wherein the control logic is further indicating the excess trailer brake application flag to at least one of a driver of a vehicle and a fleet manager.

6. A controller on a tractor for monitoring trailer brake applications comprising:
a tractor brake application input for receiving a signal indicative of a tractor brake application;
a trailer brake activation input for receiving a signal indicative of a trailer brake activation;
an automated braking application input for receiving a signal indicative of an automated brake application; and
control logic, the control logic:
receiving the signal indicative of a tractor brake application;
accumulating the number of signals indicative of the tractor brake applications for a predetermined time period;
accumulating the number of trailer brake activations for the predetermined time period;
accumulating the number of signals indicative of an automated brake application;
subtracting the accumulated number of automated brake applications from the accumulated number of trailer brake applications to obtain a difference;
comparing the difference with the accumulated number of tractor brake applications; and
recording an excess trailer brake application flag in response to the difference being greater than the accumulated number of tractor brake applications.

7. The controller as in claim 6, wherein the signal indicative of a trailer brake application is received via a power line carrier communications protocol.

8. The controller as in claim 6, wherein the trailer brake application input is coupled to an associated stop lamp device.

9. The controller as in claim 6, wherein the tractor brake application input is coupled to an associated pressure sensor.

10. The controller as in claim 6, further comprising an output for communicating the excess trailer brake application flag to at least one of a driver of the vehicle and a fleet manager.

11. The controller as in claim 6, wherein the predetermined time period is the time period beginning when the controller is powered on and ending when the controller is powered off.

12. The controller as in claim 6, wherein the predetermined period of time begins upon receiving an initial signal indicative of a foot brake application and ends in response to the accumulated number of signals indicative of trailer brake applications being greater than 25% of the accumulated number of signals indicative of foot brake applications.

13. A system for monitoring trailer brake applications comprising:
a brake sensor for indicating a driver initiated foot brake application;
a trailer controller having control logic:
receiving a signal indicative of a trailer brake activation;
totaling a number of signals indicative of a trailer brake activation during a predetermined time period; and
transmitting the total number of signals to a tractor controller;
the tractor controller in communication with the brake sensor and the trailer controller and having control logic:
receiving the total number of signals indicative of a trailer brake activation from the trailer controller;
receiving a signal indicative of a foot brake application by a driver from the brake sensor;
receiving a signal indicative of an automated brake application;
subtracting the total number of signals indicative of an automated brake application from the total number of signals indicative of a trailer brake activation to obtain a difference;
totaling a number of signals indicative of a foot brake application by a driver during the predetermined time period;
comparing the difference with the total number of signals indicative of a foot brake application by a driver;
recording an excess trailer brake application flag in response to the difference being greater than the total number of signals indicative of a foot brake application by a driver.

14. The system as in claim 13, wherein the trailer controller receives the signal indicative of a trailer brake activation from at least one of a stop lamp device and a pressure sensor.

15. The system as in claim 13, wherein the predetermined time period is about sixty (60) minutes.

16. A method for monitoring trailer brake applications comprising:
receiving a signal indicative of a trailer brake activation at a trailer controller;
totaling a number of signals indicative of a trailer brake activation during a predetermined time period; and
transmitting the total number of signals indicative of trailer brake activations to a tractor controller;
receiving the total number of signals indicative of trailer brake activations at the tractor controller;
receiving a signal indicative of a foot brake application from the brake sensor;
totaling a number of signals indicative of a foot brake application during the predetermined time period;
totaling a number of signals indicative of an automated brake application;
subtracting the total number of signals indicative of an automated brake application from the total number of signals indicative of a trailer brake activation to obtain a difference;
comparing the difference with the total number of signals indicative of a foot brake application by a driver; and
recording an excess trailer brake application flag in response to the difference being greater than the total number of signals indicative of a foot brake application.

17. The method as in claim 16, wherein the signal indicative of a trailer brake activation is received from at least one of a stop lamp device and a pressure sensor coupled to the trailer controller.

18. A method for monitoring trailer brake applications comprising:
receiving a signal indicative of a trailer brake activation at a tractor controller;
totaling a number of signals indicative of a trailer brake activation during a predetermined time period; and
receiving a signal indicative of a foot brake application from the brake sensor;
totaling a number of signals indicative of a foot brake application during the predetermined time period;

totaling a number of signals indicative of an automated brake application;

subtracting the total number of signals indicative of an automated brake application from the total number of signals indicative of a trailer brake activation to obtain a difference;

comparing the difference with the total number of signals indicative of a foot brake application; and recording an excess trailer brake application flag in response to the difference being greater than the total number of signals indicative of a foot brake application.

19. The method as in claim 18, wherein the signal indicative of a trailer brake activation is received from a stop lamp device.

20. The method as in claim 19, wherein the stop lamp device is activated by at least one of a foot brake application and an automated brake application.

21. The method as in claim 18, further comprising communicating the excess trailer brake application flag to at least one of a driver and a fleet manager.

22. A non-transitory computer-readable medium comprising computer instructions:

receiving a trailer brake application signal each time a trailer brake is applied;

receiving a foot brake application signal each time a foot brake is applied;

receiving an automated braking application signal each time an automated braking action is initiated;

determining a total number of trailer brake applications based on the number of times the trailer brake application signal is received;

determining a total number of foot brake applications based on the number of times the foot brake application signal is received;

determining a total number of signals indicative of an automated brake application based on the number of times the automated braking application signal is received;

subtracting the total number of signals indicative of an automated brake application from the total number of signals indicative of a trailer brake activation to obtain a difference;

comparing the difference with the total number of foot brake applications; and recording an excess trailer brake flag in response to the difference being greater than the total number of foot brake applications.

23. A tractor controller comprising:

means for determining a total number of trailer brake applications;

means for determining a total number of foot brake applications;

means for determining a total number of automated braking applications; and control logic that;

compares the total number of trailer brake applications with the total number of automated braking applications; and records an excess trailer brake flag in response to the difference between the total number of trailer brake applications and the total number of automated braking applications being greater than the total number of foot brake applications.

* * * * *